United States Patent
Azhikodan et al.

(10) Patent No.: US 12,327,141 B1
(45) Date of Patent: Jun. 10, 2025

(54) DYNAMIC INSTANCE SELECTION AND ALLOCATION

(71) Applicant: Amazon Technologies, Inc., Reno, NV (US)

(72) Inventors: Akhil Raj Azhikodan, Seattle, WA (US); Gunjan Garg, Bothell, WA (US); Narayan Agrawal, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 702 days.

(21) Appl. No.: 17/532,979

(22) Filed: Nov. 22, 2021

(51) Int. Cl.
*G06F 9/50* (2006.01)

(52) U.S. Cl.
CPC .......... *G06F 9/5038* (2013.01); *G06F 9/5077* (2013.01)

(58) Field of Classification Search
CPC ........ G06F 9/50; G06F 9/5005; G06F 9/5011; G06F 9/5016; G06F 9/5022; G06F 9/5027; G06F 9/5044; G06F 9/5055; G06F 9/5061; G06F 9/5066; G06F 9/5077; G06F 9/52

See application file for complete search history.

(56) References Cited

U.S. PATENT DOCUMENTS 9,720,732 B1 * 8/2017 Shih ...................... G06F 9/4887
2022/0027744 A1 * 1/2022 Krishnan ......... G06Q 10/06315

* cited by examiner

*Primary Examiner* — Andy Ho

(74) *Attorney, Agent, or Firm* — Hogan Lovells US LLP

(57) ABSTRACT

Approaches presented herein can allocate resources in such a way that sufficient capacity will be provided to perform a job or task, while minimizing any excess capacity included with those allocated resources. A number of jobs can be performed with differently sized resource instances in some embodiments, to determine an instance size, from a set of available sizes, that is appropriate for each of those jobs. Various parameters for those jobs can be determined, and those values associated with the determined instance sizes. When a new job is received that is to be performed, the parameter values for that job can be compared against the corresponding values for these testing jobs, and an instance size can be selected where a testing job that was successfully performed with that instance size had the same or larger values for these parameters.

20 Claims, 7 Drawing Sheets

Target Time Series (TTS) 200

| Timestamp | Item ID | Store | Demand |
|---|---|---|---|
| 9/26/2020 | Socks | NYC | 10 |
| 9/26/2020 | Socks | DUB | 10 |
| ... | ... | ... | ... |
| 9/26/2021 | Socks | NYC | 14 |

Related Time Series (RTS) 210

| Timestamp | Item ID | Store | Price |
|---|---|---|---|
| 9/26/2020 | Socks | NYC | 3.45 |
| 9/26/2020 | Socks | DUB | 3.45 |
| ... | ... | ... | ... |
| 9/26/2021 | Socks | NYC | 3.45 |
| ... | ... | ... | ... |
| 10/26/2021 | Socks | NYC | 3.45 |

DYNAMIC INSTANCE SELECTION AND ALLOCATION

BACKGROUND

An increasing number and variety of tasks are being performed using shared resources, such as network-connected servers hosted in the "cloud." These tasks may vary widely in size and complexity, and are often allocated more resource capacity than is needed in order to ensure that there is sufficient capacity to successfully complete performance. In many instances, this allocation of excess resource capacity is due in large part to the inability to accurately predict an amount of capacity needed for a task that has not previously been performed, or for which no historical performance data is available. Such allocation of excessive resource capacity can be very costly from at least a resource perspective, particularly for a large number of tasks to be performed in parallel.

BRIEF DESCRIPTION OF THE DRAWINGS

Various embodiments in accordance with the present disclosure will be described with reference to the drawings, in which.

DETAILED DESCRIPTION

Figure 1:
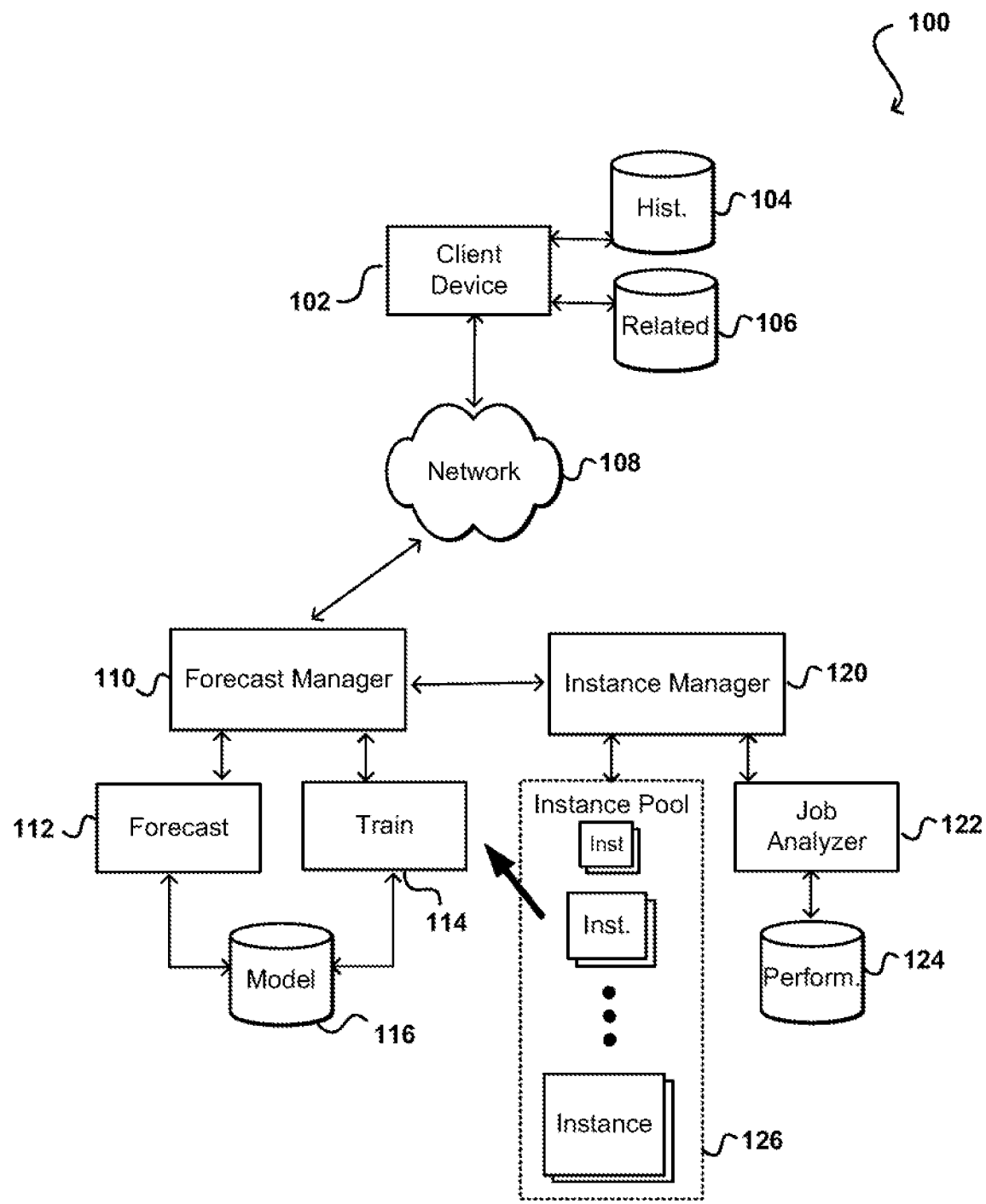
FIG. 1 illustrates a job performance system that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the performance of various computing jobs or tasks using shared computing resources. In particular, various approaches provide for the determinations of resources, or resource instances, that will have sufficient capacity to perform various jobs or tasks but not an unnecessary amount of excessive amount of capacity. In at least one embodiment, a testing phase can be performed that involves processing a number of different jobs with resource instances of different types, which have different sizes or capacities. A range of available instance sizes can be determined, and instances near a middle of that range used for a first round of testing to perform these selected jobs. For jobs that complete successfully, a range of smaller sizes can be determined, and an instance selected from a middle of that range for testing in a next round. As used herein a "smaller" instance size can refer to any type or configuration or resource that has at least one aspect of lower capacity, such as an instance that has less memory capacity or processing capacity, or is of a type that can produce results at a lower rate (e.g., uses a different processor, such as a CPU or GPU, with lower (or at least different) computational capability) but is less computationally expensive to operate, among other such options. In at least one embodiment, selecting a "smaller" instance can be considered selecting a resource instance that is less expensive to operate, from at least a resource point of view. In at least one embodiment, each resource instance type can be sized or otherwise ordered by one or more factors such as cost, capacity, or complexity, and an attempt can be made to select an instance type that can perform a given task based on various parameter values for that task, but that involves a lowest or least amount of cost, capacity, or complexity. For jobs that do not complete successfully, a range of larger sizes can be determined, and an instance selected from a middle of that range for testing. This process can continue until an end criterion, such as a maximum number of testing attempts or rounds, is reached, and then the smallest instance size that was able to process each job can be indicated as optimal or preferred, although any larger instance can also be marked as appropriate and available for selection. Various parameters (e.g., dataset size, algorithm, and hyperparameters) can be identified for each of these jobs that can impact the size of the job, and thus the size of the instance needed, and these can be stored along with the optimal type or size of instance. When a new job is received that is to be performed, the parameter values for this new job can be compared against the values of these testing jobs, and smallest instance or size can be selected where the corresponding testing job had values for all these parameters that were the same as, or larger than, the current job. If an instance of that type is not available, the next largest instance type that is available can be selected and allocated to perform the job.

Various other such functions can be used as well within the scope of the various embodiments as would be apparent to one of ordinary skill in the art in light of the teachings and suggestions contained herein.

FIG. 1 illustrates an example task performance system 100 that can be utilized in accordance with various embodiments. In this example, the task performance system 100 allows users to utilize one or more client devices 102 to submit requests across one or more networks 108. These can include any of a wide variety of tasks, but in this example relate to forecasting data. As such, a request from a client device 102 may include a request to generate one or more forecasts or predictions based, at least in part, upon historical data stored in a historical data store 104, as well as related data stored in a related data store 106, which correspond to a different table or partition than that used for the historical data in a single database. This request may be to train a model to perform such forecasting, or to perform inferencing using such a trained model, among other such options.

In this example, the request can be received, or directed to, a forecast manager 110. The forecast manager can work with a forecasting module 112, system, service, process, or application to utilize an appropriate model, algorithm, or network to perform forecasting or inferencing based, at least in part, upon data received, or otherwise associated, with the request. The forecasting module 112 can analyze information for the request, and can select an appropriate model for performing the forecasting job from a model repository 116. If the request is to train such a model, or a model needs to be trained in order to perform the forecasting job, the forecast manager 110 can work with a training module 114, system, service, process, or application to select an appropriate default model from a model repository 116 and train that model to perform the requested job or task. Once a job is completed, results of that job can be provided back to that client device 102 or to another appropriate recipient, and may be logged or stored locally as well if appropriate and permissible.

In this example, a resource used to perform the job can be allocated from a pool of available resource capacity. In this example, the resources can include computing instances or storage instances that may be allocated from such an instance pool 126. Each instance can correspond to a computing resource or portion of a computing resource, and may correspond to a physical or virtual instance (e.g., one of a number of virtual machines on a computing or data server). A computing resource can include any appropriate device, including hardware, software, and configuration, for performing one or more tasks, as may be performed using one or more processors as discussed elsewhere herein. These instances may be selected from various instance types, which may each provide different amounts or types of capacity. For example, a large compute instance might include twelve processors (e.g., central processing units (CPUs), graphics processing units (GPUs), or processor cores) and 4 GB of memory, while a small compute instance might include a single processor and 1 GB of memory.

For a job to be performed by a forecasting module 112 or a training module 114, the forecasting manager 114 may communicate with an instance manager 120 to have one or more instances allocated to perform the job. The instance manager can take in information about the job, and pass that information to a job analyzer 112 that can compare that information against known or prior performance data stored in a performance database 124 or other such location, and determine one or more appropriate instance types to be allocated to perform the job. The instance manager 120 can then verify capacity of that type, then allocate one or more instances of that type to perform the job.

As mentioned above, however, many existing approaches allocate resources with more capacity than is typically necessary, in order to ensure that a job does not fail for insufficient resources. There are various downsides to such an approach, however, as the need to provide and maintain additional but unused capacity unnecessarily increases the cost, complexity, footprint, and power consumption of providing these resources. The inability to allocate this at least some of this unused capacity to other tasks can also slow the throughput of the system, and introduce latency and potential failures for other, unrelated jobs. High dependence on a single instance type for training jobs can make performance of jobs highly susceptible to availability drops. If an instance type is not available, the workflow can keep retrying until an instance of that type is obtained, which can block other jobs from being performed and can tie up resources.

Accordingly, approaches in accordance with various embodiments attempt to overcome these and other such deficiencies by attempting to provide or allocate compute instances, or other such resources, for individual jobs that are appropriate in size, type, capacity, configuration, or other such aspects, whereby those jobs are not at risk for failure due to insufficient capacity, but the system will not be negatively impacted by providing an excessive amount of capacity for these individual jobs. In at least one embodiment, a job analyzer 122 or similar component, system, application, service, or process can analyze information for a job to be performed. This information can include any type of information (e.g., parameters, selections, aspects, or characteristics) that can be useful in determining a scope of a job or task to be performed, at least with respect to other jobs that have been performed. This can include, for example, a type of job or task to be performed, or an amount of data to be processed, among other such options. As mentioned, it can be difficult to determine or predict the exact amount of capacity needed for a job that has not been performed previously on a specific set of data. If sufficient parameter values are provided, however, these values can be compared against similar values for other jobs in order to determine resource allocations that should be sufficient to perform a given job without allocating additional capacity for a larger allocation.

An example of a job that can be performed using such a system relates to forecasting based on time series data. A forecasting service can utilize machine learning to delivery highly accurate inferences as to future values. Such a service may support a number of algorithms for forecasting, as may include one or more deep learning algorithms, such as DeepAR+ and CNN-QR. Such algorithms can require training on a customer dataset before forecasting can be performed. Training and inferencing tasks may be performed using resources allocated using approaches such as those discussed and suggested herein.

With respect to training, a training job for a given customer or dataset can differ in multiple ways. These can include, for example, various characteristics of the dataset, the training algorithm to be used, and various hyperparameters used for the training algorithm. Example dataset characteristics may differ in factors such as a time frame of that time series (which can impact a number of observations included in the dataset for a given frequency), a frequency of observations per time frame, a number of dimensions in a single record, and a number of time series, among other such options. In some embodiments, there may be a different time series for each different item, or other such object, aspect, or factor that may be of interest for a task such as forecasting. A user can specify a training algorithm, or one can be provided based at least in part upon a type of task to be performed, where example training algorithms include ARIMA (auto regressive integrated moving average), ETS (error trend and seasonality), NPTS (non-parametric time series), DeepAR+, CNN-QR, and Prophet. As mentioned, each of these training algorithms can have a different set of hyperparameters, which can include continuous or categorical values that can differ in various aspects. For example, training algorithms can have different training context lengths, which indicate how far in the past (or for what period of training data) a training model should look to predict a next time point. Different algorithms can also have different forecast horizons, which indicate how far in the future a given training model can predict. Neural network-based algorithms can also specify different network architectures, as may relate to a number of averaged models, cells, or layers to be utilized.

As mentioned, since larger compute instances can be expensive and may have relatively limited availability, it can be advantageous to a resource provider, as well as others utilizing or relying on those resources, to utilize smaller instances, such as the smallest possible available instance, that can successfully perform an individual job. As presented herein, approaches can attempt to determine appropriate instance or resource types of sizes for a job or task by examining parameters or characteristics of a job that can be compared to those of previous jobs that were successfully performed. If an instance type was sufficient to successfully perform a prior job where all such parameters values or characteristics were the same or larger, then that instance type should be sufficient to successfully perform the current job. Such processing can be applied to any type of job where, for example, the size of the instance or resource needed is directly proportional to the size of the dataset, whether that job is to train a neural network, perform inferencing for a neural network, perform hyperparameter optimization, or perform other calculations or determinations.

In at least one embodiment, a number of parameters N (or any of various characteristics or aspects that are quantifiable) can be identified where values can be accurately determined, and where those value can impact a size or type of resource needed to perform a job. The number of parameters can be used to define an N-dimensional space, where each of these dimensions corresponds to one of these parameters for a job. Analyzing all possible combinations can be expensive for a large number of possible training or parameter combinations, however, such that it can be desirable in at least some embodiments to provide a way to expedite the process of identifying an appropriate resource size or type.

Figures 2A, 2B:
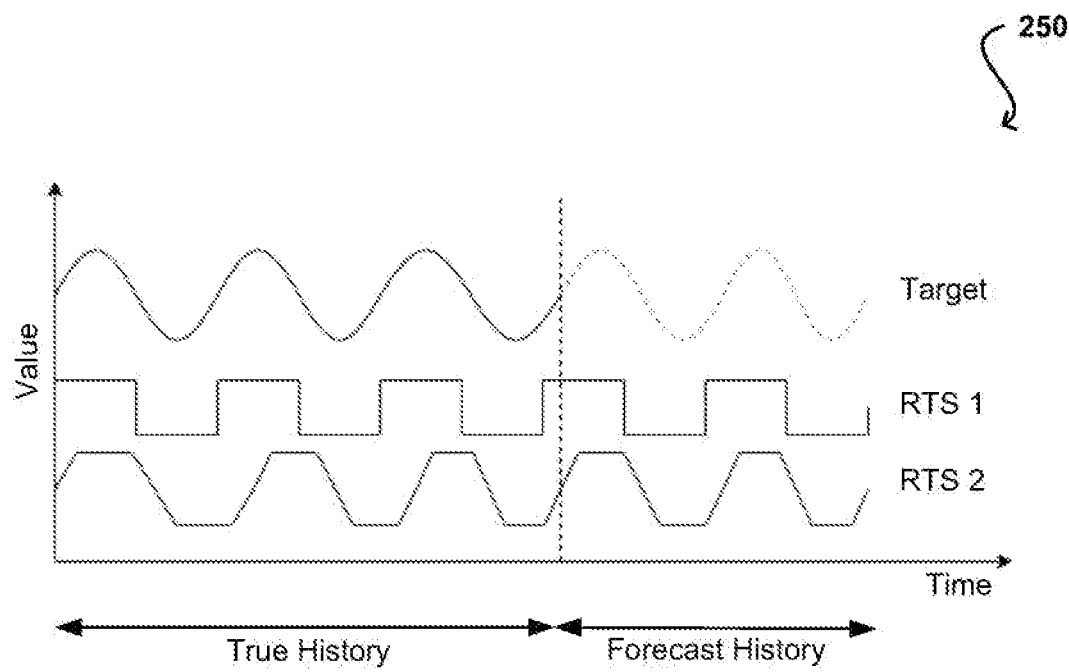
FIGS. 2A and 2B illustrate time series data that can be analyzed in accordance with various embodiments.

In determining appropriate parameters to evaluate, the time required for training can be directly proportional to dataset size, at least for certain well understood datasets. Dataset size alone cannot be used to determine an appropriate instance type, however, as other factors such as hyperparameters can also affect the processing time and the memory requirements. Dataset size can be defined by three different dimensions for at least some datasets, including dimensions for a number of rows (e.g., observations), columns (e.g., related time series), and items forecasted. An example dataset 200 is illustrated in FIG. 2A, wherein each row is an observation, which here corresponds to data captured for a given store on a given date. The columns correspond to the related time series, here the demand (e.g., sales) for a given store on a given date. A second table 210 includes similar data but for another related time series, here the price of the items at each of those observations. In this example, these two related time series can be used to predict future values for these time series, as illustrated in plot 250 of FIG. 2B. These time series predictions can then be used to predict a target value at future points in time, such as revenue generated when a predicted number of socks is sold at a predicted price. For such datasets, the amount of processing and memory capacity needed to perform such forecasting will be directly proportional to the size of this dataset.

An approach in accordance with at least one embodiment can involve running a parallel search across these N dimensions. A determination can be made, based at least in part upon available capacity and other such factors, as to a number of parallel training jobs J to be evaluated in such a search process. For a given number of jobs J, such as J=10, the search process can select 10 possible configurations, whether selected at random or according to a selection algorithm to ensure sufficient diversity, and can run benchmarking jobs on 10 medium sized instance types. In order to expedite the search process, a range of available instance types is determined, and an initial instance type is selected for testing that is at, or near, a center of this range. Individual jobs can be analyzed upon completion. If it is determined that this job failed because there was insufficient memory, or the job took longer than expected due to insufficient processing capacity or other such factors, then the current instance type can be marked as not applicable, or otherwise not to be used to process this job or a job with these same parameters. In addition, any smaller instance type that would have less capacity can also be marked as not applicable. Another selection can then be made to attempt to successfully perform this job using a larger instance type. In at least one embodiment, an updated range can be determined that runs from the current instance size that just performed unsuccessfully and the largest available instance type. A selection of an instance type can be made from within this range, and as close to a center point of this range as possible. In will be appreciated that there may be a limited number of instance types with corresponding sizes, and that there may not be an instance type that is in an exact center point of each range, but a search algorithm can attempt to determine an instance type that is closest to this center point. A search process may be instructed to select the closest instance type, or if there is a larger or smaller instance type near this center point, the process may be instructed to default to one or more other, such as to always select the smaller of the two for testing, among other such options (e.g., number of larger or smaller instance types available).

If a selected instance type is able to perform a job within an expected or allowable amount of time, that current job can be marked as applicable or appropriate, or can be marked as a preferable or optimal size if not smaller instance type that has been tested was able to successfully complete the same job within the target amount of time. All larger instance types can also be marked as applicable or appropriate, such that these instance types can be used if a smaller applicable instance type is not available, but these larger instance types will not be marked as preferable or optimal, etc. The range can be updated between the current instance type and a smallest available instance type, and a selection can be made of an instance type that falls at, or near, a center point of this range, to essentially divide this search space in two. The new instance type can then be used to perform this job to determine whether the instance type can successfully perform the job, without degradation in performance and within the target amount of time, such that this smaller instance type can be determined to be preferable or optimal for a job with the current parameters.

In various embodiments, there can be different criteria used to determine when to stop such a search process. In at least one embodiment, this may correspond to a maximum number of search attempts, or instance type selections, assuming at least one instance type has proven to be successful. In other embodiments, this may be a maximum amount of time or resources used for the testing. In other embodiments, a search can be performed until an instance type is located that can successfully perform a given job, but that performance takes up almost an entirety of the target period of time for performance, such that a smaller instance is unlikely to successfully perform that job within that amount of time.

In at least one embodiment, each time a job is to be started on a given instance type, a check can be performed to ensure that there is not a larger successful training job on the instance type. If there is, then another random configuration can be selected for testing. Another check can be performed to ensure that there is not a smaller instance type that completed the training job successfully, and if so then another random configuration can be selected for testing.

Figure 3:
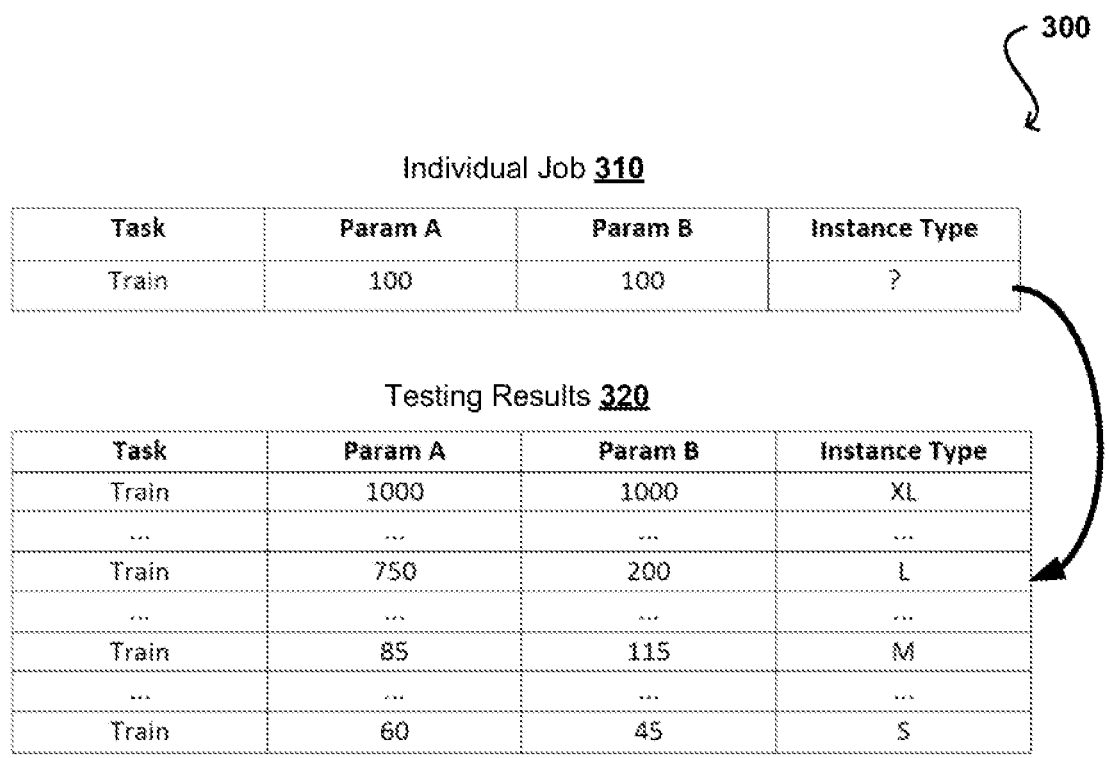
FIG. 3 illustrates data that can be used to determine an instance type for a task that can be utilized in accordance with various embodiments.

Once optimal or right-sized instance types (from an available set of instance types) have been determined for each of these testing jobs, a list, table, or other designation of instance types appropriate for given jobs can be generated, as illustrated by example table 320 of FIG. 3. In this example, the parameter values or characteristics for each of these testing jobs are identified, as well as a type of instance (or other resource) that was selected as optimal for a job with those characteristics. In this example, it can be assumed that any larger size instance would also be able to successfully perform a job with those parameter values or characteristics. The values for these parameters or characteristics can then also define a point in the N-dimensional space corresponding to these resources.

Testing results such as the table 320 in FIG. 3 can then be used to attempt to determine the optimal, best, or "right-sized" instance type to use for a specific job, at least from a set of available instance types. In this example, a job to be performed may include various parameter values and characteristics, as illustrated in table 310 of FIG. 3. The job-specific parameter set can then be compared against the value in the job performance table 320. A determination can be made as to a location in that table where that job-specific data could be slotted such that all rows above that entry would have larger values for all parameters or characteristics. As illustrated, an example job with two parameter values of 100 each (limited to two parameter values for simplicity of explanation) would sit below an entry that had 750 and 200 for these two parameter values, but above an entry that has 85 and 115, or 60 and 45, for these values. This can be a very efficient way to determine that instance types at or above the values for the current job in the table should be sufficient to perform the job successfully within the target period of time. A selection of an instance type to be used to perform this job can then be the smallest instance type listed above the placement of the current job in the table. In this example, it can be seen that a large (L) and extra-large (XL) instance type should both be able to successfully perform the job. A selection can then be made of the smallest of these instance types that is available for the job. This can mean that if an instance of a large instance type is available then that can be selected for this job, but if not then an extra-large instance type can be selected. Such an approach ensures that enough capacity is allocated to perform the job, but attempts to minimize an amount of excess capacity that would be allocated for that job. It should be understood that in many instances such a process will compare parameter and characteristic values without generating a table or determining a slotting position, with such a visual description used primarily for explanation. Another way to think of this testing result data is that there are various configuration buckets or clusters generated in this N-dimensional space. Each cluster or bucket includes a range of values for the various parameters or characteristics, and for a new job the process can attempt to identify buckets or clusters where all parameter values or characteristics are the same or larger than for the current job, which identifies the instance types that can be utilized for the job. The smallest available instance type out of these identified types can then be selected to perform the job.

In this example, the output of this search can be a set of points in an N-dimensional space, where each point is mapped to an optimal or "right-sized" instance or instance type. When a job is to be performed, such as when a user provides a request for a new dataset, the characteristics of that new dataset can be determined. An appropriately sized instance can then be selected based at least in part upon these benchmarked results, such that the job performance can be performed using a right-sized instance without excessive unused capacity. If an instance of this type is not available, then a next largest instance type that is available can be selected to perform the job.

As mentioned, any of a number of different parameters or characteristics can be selected for analysis that can impact a size of job to be performed. These can include, as examples and without limitation, the algorithm utilized, dataset group statistics, forecast dimensions, number of rows, data size, data format, featurization configuration, number of featurizations, forecast configuration, forecast types, forecast horizon, evaluation parameters, number of testing windows, window offsets, context length, epochs, learning rate, learning rate decay, likelihood, maximum learning rate decays, number of averaged models, number of cells, number of layers, use of related data, and use of item metadata.

In some embodiments, an instance manager may be able to allocate instances of a size that is determined based at least in part upon such testing. For example, it may be determined that a job can be processed using a certain amount of processing and memory capacity, which may be a fraction of that available on a given device. In at least some embodiments, an instance can be allocated that has this target capacity, at least to an extent to which the capacity can be divided or segmented, in order to further right-size the instance. Rules can be applied to ensure that such configuration is valid, and a valid instance type closest to the target capacity can be allocated for a given job.

Figure 4:
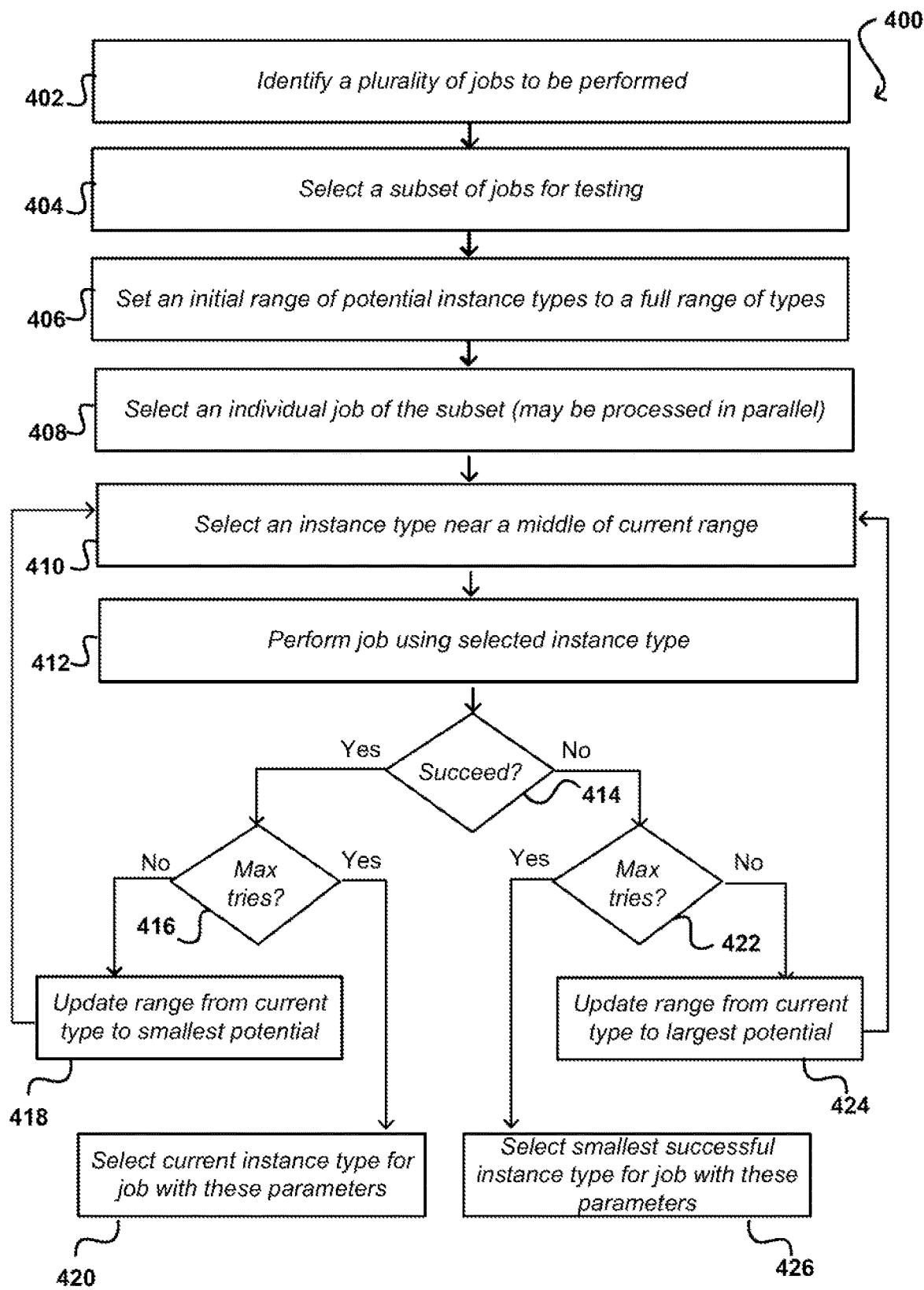
FIG. 4 illustrates an example process for generating a set of task performance data that can be utilized in accordance with various embodiments.

FIG. 4 illustrates an example process 400 for determining a plurality of instance buckets that can be utilized in accordance with various embodiments. It should be understood that for this and other processes presented herein that there can be additional, fewer, or alternative steps performed in similar or alternative orders, or at least partially in parallel, within the scope of the various embodiments unless otherwise specifically stated. Although the term "bucket" is used with this example to indicate ranges of values that can be associated with a type of class of instance, it should be understood that this is an example used for explanatory purposes, and that the data may be organized and presented in any appropriate manner as discussed and suggested elsewhere herein. In this example, a plurality of jobs to be performed can be identified 402, and a subset of these jobs can be selected 404 for testing, such as through random selection. In other embodiments, a selection approach can be utilized that ensures diversity of job values, up to a maximum number of jobs to be tested. An initial range of potential instance types to process these jobs can be set 406 to a full range of instance types, from a smallest type to a largest type (or type with most capacity). An individual job of this subset may be selected 408 for testing, although in many instances testing of these instances can be performed at least partially in parallel. An instance type to be used for testing on this job can be selected 410 from near a middle of the current range, such as approximately halfway between the largest and smallest instance sizes currently under consideration. This job can then be performed 412 using this selected instance type. A determination can be made 414 as to whether the job was performed successfully, within an allotted time for performance and without a degradation in performance. If so, a determination can be made 416 as to whether a maximum number of tries (or other end criterion) has been reached. If not, the range or search space can be updated 418 from the current instance type to a smallest possible instance type, an instance can be selected near the middle of this new range, and the process can continue. If there is only the smallest instance type left, then the testing can be performed using this smallest instance type. If the maximum number of retries (or other end criterion) has been reached, then the current instance type can be selected 420, or indicated as optimal or preferred, for a job having the corresponding parameter and characteristic values.

If, however, it is determined that the job did not successfully complete within the allotted time and without unacceptable degradation in performance, then a determination can be made as to whether a maximum number of retries (or other end criterion) has been met with at least one successful performance. If so, then the smallest successful instance type can be selected 426 and indicated as optimal or preferred, for a job having the corresponding parameter and characteristic values. If not, then the range can be updated 424 from the current type to a largest potential type, and the process can continue. In some embodiments, if a maximum number of attempts has been reached without successful performance, then instead of continued testing the process may cause the largest instance size to be indicated as optimal for a job with those parameter or characteristic values.

Figure 5:
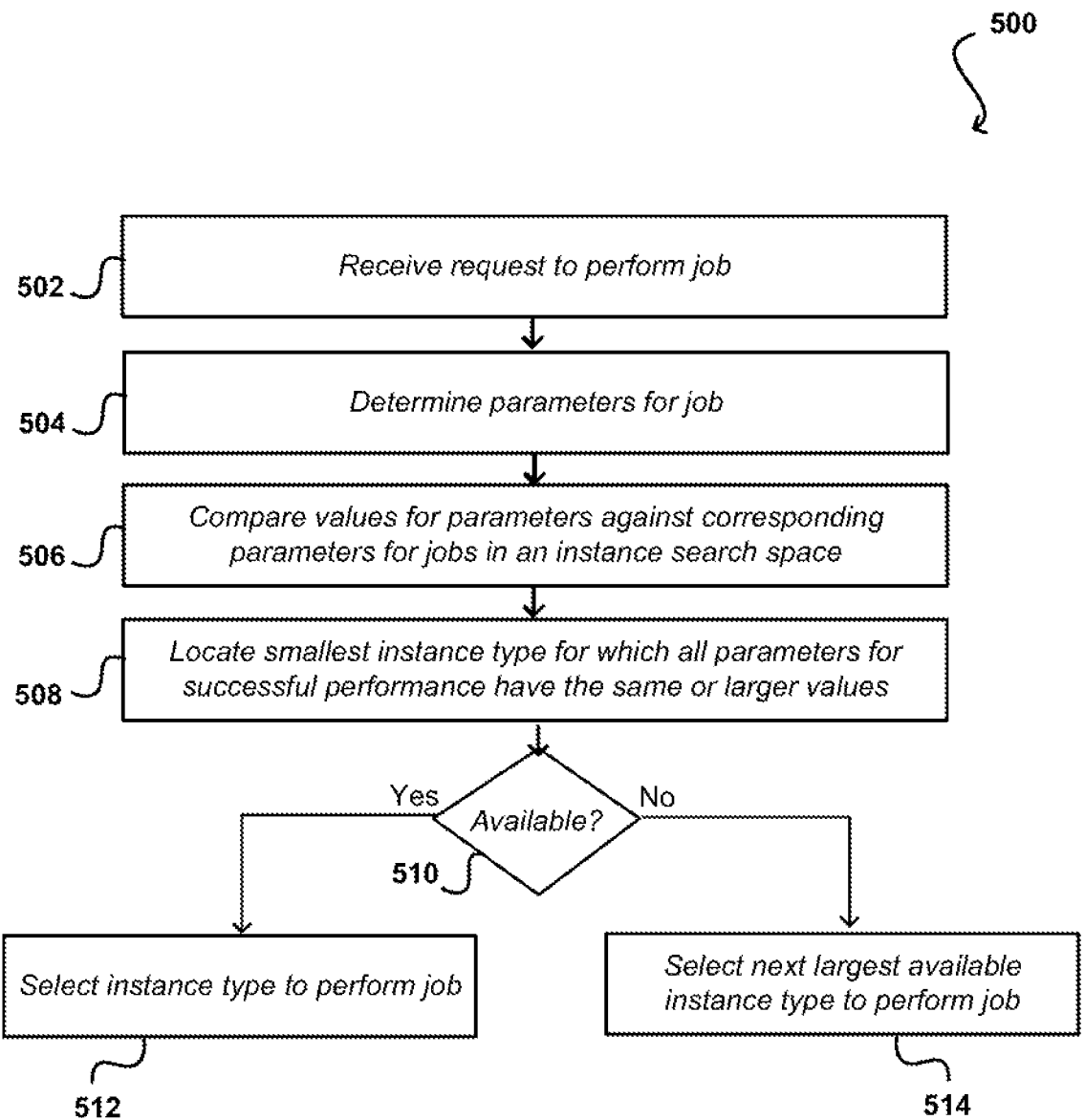
FIG. 5 illustrates an example process for determining an instance type for a job that can be utilized in accordance with various embodiments.

FIG. 5 illustrates an example process 500 for determining an appropriate type or size of instance to perform a job or task, which can be utilized in accordance with various embodiments. In this example, a request can be received 502 to perform a job, where that job can involve processing data from an associated dataset. In this example, a number of parameters or characteristics can be determined 504 for the job, and the values for these parameters or characteristics can be compared 506 against values for corresponding parameters or characteristics for other jobs in an instance search space. As mentioned, the search space can take many forms, such as an N-dimensional search space, table, list, or set of values, among other such options. A smallest instance type can be located 508, or otherwise identified, for which all parameters for a job with successful performance have the same or larger values. A determination can be made 510 as to whether an instance of that type is available. If so, that instance type can be selected 512 to perform that job and an instance of that type allocated. If not, a next largest available instance type can be selected 514 to perform that job.

In some embodiments, it may not be necessary for all parameter values of a testing job to be equal to, or larger than, the values for a current job in order to select a corresponding instance type. For example, there may be some parameters, or combinations of parameters, that do not significantly impact the size, or that are outweighed by other parameters or combinations. In at least some embodiments, these parameters may not be considered or utilized to determine the n-dimensional space, as in at least some embodiments only dimensions are considered for the n-dimensional space that have at least some deterministic correlation with the training time or resource requirements. If, for example, x is the dimension, y is the time taken for training, and z is the resource requirement (e.g., memory or CPU capacity), then in at least one embodiment all of the following must be true for parameters that are deterministically correlated with training time or resource requirements:

$$x_1 < x_2 \text{ then } y_1 \leq y_2 \text{ if } w_1 = w_2$$

$$x_1 < x_2 \text{ then } w_1 \leq w_2 \text{ if } y_1 = y_2$$

If a given parameter does not affect the training time or resource requirement, then that parameter should not be included in the n dimensions, in at least some embodiments. In other embodiments, the parameters may be included in the n dimensions but may be indicated (or otherwise determinable) to not impact training time or resource requirements, such that they should not be considered for such purposes. Any such logic can be incorporated into comparison, search, selection, or allocation steps of various processes presented herein.

Figure 6:
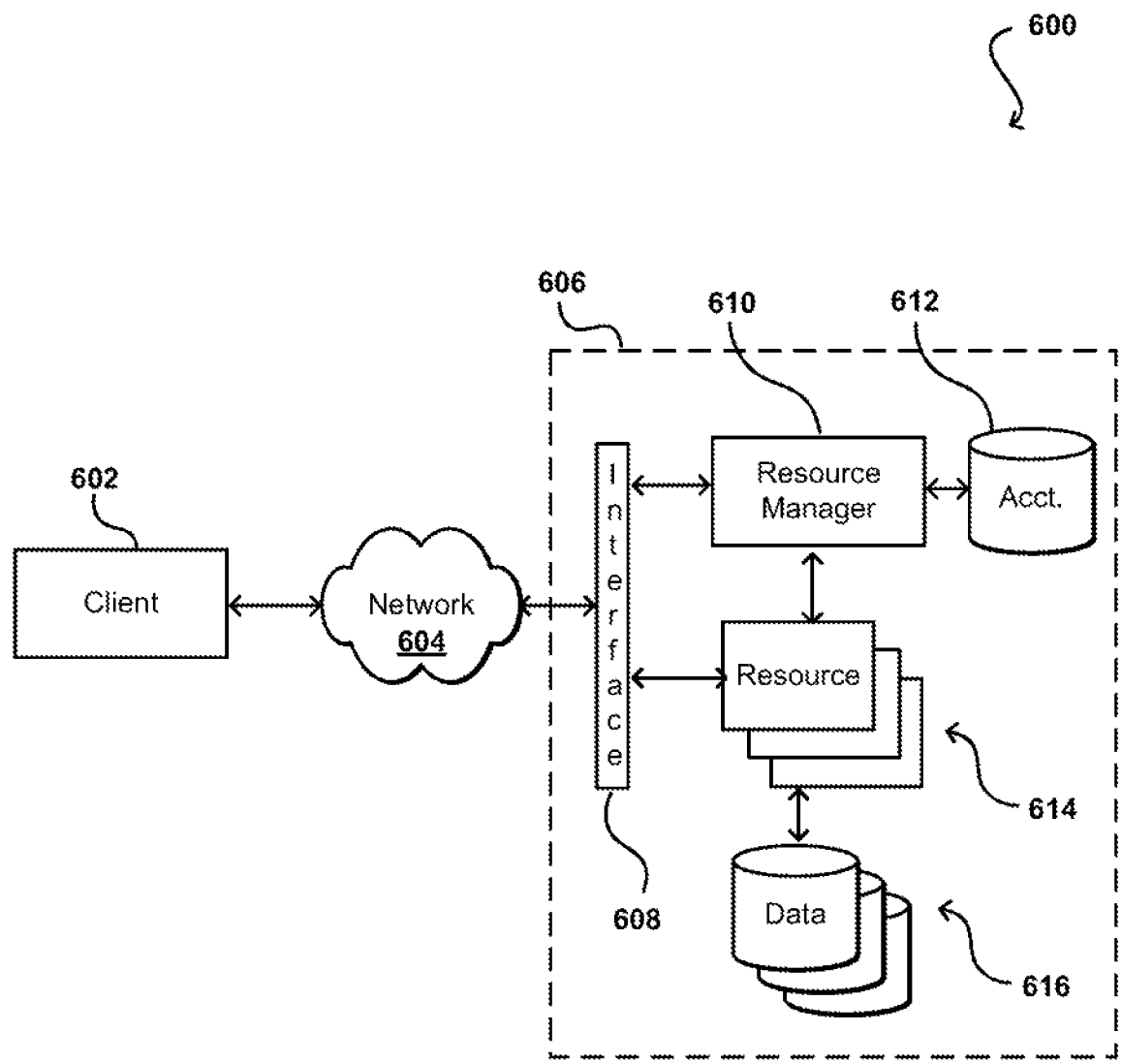
FIG. 6 illustrates components of a resource environment in which aspects of various embodiments can be implemented.

FIG. 6 illustrates an example environment 600 in which aspect of various embodiments can be implemented. Such an environment can be used in various embodiments to provide resource capacity for one or more users, or customers of a resource provider, as part of a shared or multi-tenant resource environment. In this example a user is able to utilize a client device 602 to submit requests across at least one network 604 to a multi-tenant resource provider environment 606. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 604 can include any appropriate network, including an intranet, the Internet, a cellular network, a local area network (LAN), or any other such network or combination, and communication over the network can be enabled via one or more wired and/or wireless connections. The resource provider environment 606 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 606 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 614 of one or more types. These types can include, for example, application servers operable to process instructions provided by a user or database servers operable to process data stored in one or more data stores 616 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 614 can submit a request that is received to an interface layer 608 of the provider environment 606. The interface layer can include application programming interfaces (APIs) or other exposed interfaces enabling a user to submit requests to the provider environment. The interface layer 608 in this example can also include other components as well, such as at least one Web server, routing components, load balancers, and the like. When a request to provision a resource is received to the interface layer 608, information for the request can be directed to a resource manager 610 or other such system, service, or component configured to manage user accounts and information, resource provisioning and usage, and other such aspects. A resource manager 610 receiving the request can perform tasks such as to authenticate an identity of the user submitting the request, as well as to determine whether that user has an existing account with the resource provider, where the account data may be stored in at least one data store 612 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 602 to communicate with an allocated resource without having to communicate with the resource manager 610, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 610 (or another such system or service) in this example can also function as a virtual layer of hardware and software components that handles control functions in addition to management actions, as may include provisioning, scaling, replication, etc. The resource manager can utilize dedicated APIs in the interface layer 608, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 608 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 7:
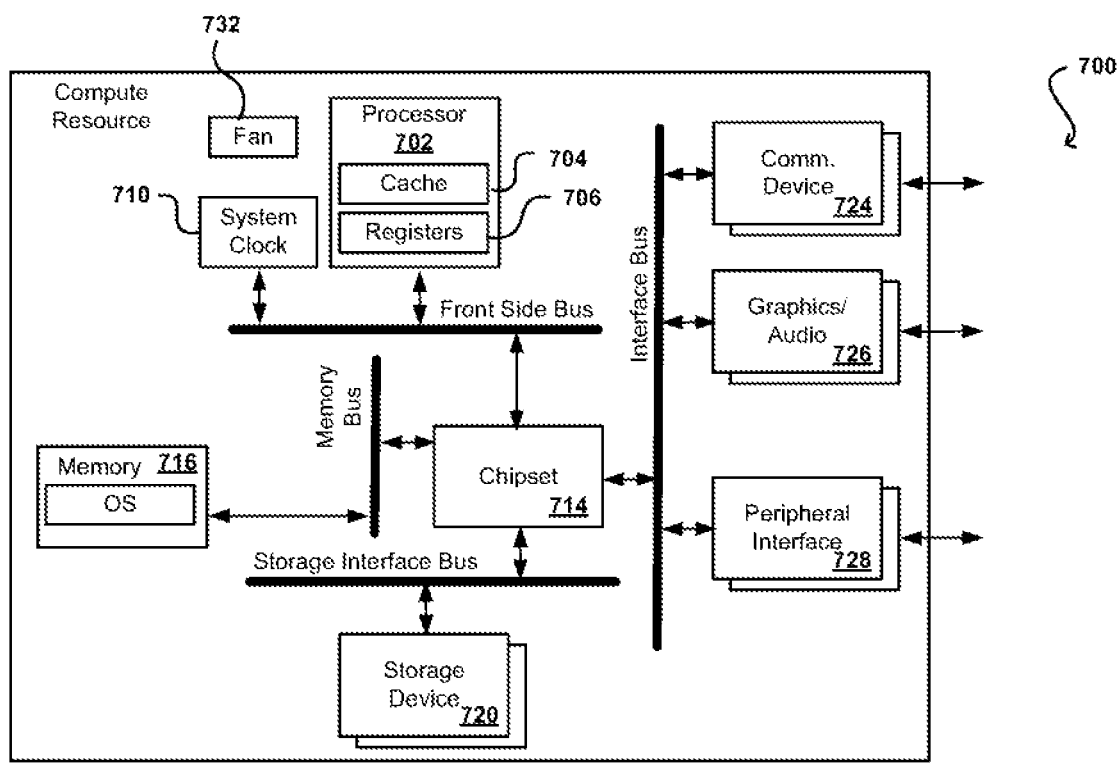
FIG. 7 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 7 illustrates components of an example computing resource 700 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 700 (e.g., a desktop or network server) will have one or more processors 702, such as central processing units (CPUs), graphics processing units (GPUs), and the like, that are electronically and/or communicatively coupled with various components using various buses, traces, and other such mechanisms. A processor 702 can include memory registers 706 and cache memory 704 for holding instructions, data, and the like. In this example, a chipset 714, which can include a northbridge and southbridge in some embodiments, can work with the various system buses to connect the processor 702 to components such as system memory 716, in the form or physical RAM or ROM, which can include the code for the operating system as well as various other instructions and data utilized for operation of the computing device. The computing device can also contain, or communicate with, one or more storage devices 720, such as hard drives, flash drives, optical storage, and the like, for persisting data and instructions similar, or in addition to, those stored in the processor and memory. The processor 702 can also communicate with various other components via the chipset 714 and an interface bus (or graphics bus, etc.), where those components can include communications devices 724 such as cellular modems or network cards, media components 726, such as graphics cards and audio components, and peripheral interfaces 728 for connecting peripheral devices, such as printers, keyboards, and the like. At least one cooling fan 732 or other such temperature regulating or reducing component can also be included as well, which can be driven by the processor or triggered by various other sensors or components on, or remote from, the device. Various other or alternative components and configurations can be utilized as well as known in the art for computing devices.

At least one processor 702 can obtain data from physical memory 716, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 704 in at least some embodiments. The computing device 700 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 728, a communication device 724, a graphics or audio card 726, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 702 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive messages, such as datagrams.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the VO adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the IO adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network— or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   performing, using a plurality of resource instances of different sizes, a plurality of testing tasks having different values for a set of task parameters;
   determining, for individual testing tasks, a smallest instance of the plurality of resource instances that successfully performs the individual testing tasks;
   receiving a request to perform a current task;

comparing current values for a set of task parameters for the current task against testing values, for the set of task parameters, for the plurality of testing tasks;

identifying the smallest instance, available for allocation, for which the testing values for at least one of the plurality of testing tasks are at least as large as the current values for the current task; and allocating the identified instance to perform the current task.

2. The computer-implemented method of claim 1, wherein the current task relates to a dataset, and wherein the set of task parameters further relate to one or more characteristics of the dataset, an algorithm to be used to process the dataset, or a hyperparameter of the algorithm.

3. The computer-implemented method of claim 1, wherein the identifying of the smallest instance includes testing multiple resource instances of different sizes over each of a plurality of testing rounds.

4. The computer-implemented method of claim 3, further comprising:

determining a range of testing sizes for individual ones of the plurality of testing rounds based, at least in part, upon a result of a prior testing round using a resource instance of a selected size; and selecting an individual size of the resource instance to use for an individual testing round from near a midpoint of the range of testing sizes determined for the individual ones of the plurality of testing rounds.

5. The computer-implemented method of claim 1, wherein values for the set of task parameters for individual tasks define respective points in an N-dimensional search space.

6. A computer-implemented method, comprising:

receiving a request to perform a current task with respect to a dataset;

comparing current values for a set of parameters for the current task against prior values for a set of previously-performed tasks performed using resource instances of different sizes;

identifying a resource instance, of the resource instances of different sizes, for which the prior values for at least one of the previously-performed tasks are at least as large as the current values for the current task; and allocating the identified resource instance to perform the current task.

7. The computer-implemented method of claim 6, further comprising:

selecting the previously-performed tasks as a set of testing tasks having different testing values for the set of parameters; and performing the previously-performed tasks using the resource instances to determine one or more of the resource instances having individual sizes and that successfully perform the testing task.

8. The computer-implemented method of claim 6, wherein individual tasks are performed in multiple rounds with the resource instances of the different sizes, wherein the different sizes are selected from size ranges determined based, at least in part, the individual sizes of the resource instances that were able to successfully, or unsuccessfully, perform the individual tasks.

9. The computer-implemented method of claim 8, wherein at least one of the resource instances to perform at least one of the individual tasks for each of the multiple rounds is selected near a midpoint of a size range determined for at least one of the multiple rounds.

10. The computer-implemented method of claim 6, wherein the set of parameters include parameters relating at least the dataset, an algorithm to perform the current task, or one or more hyperparameters relating to the algorithm.

11. The computer-implemented method of claim 6, wherein the set of parameters include at least one parameter that is from an algorithm utilized to perform a task, dataset group statistics, forecast dimensions, a number of rows, a data size, a data format, featurization configuration, a number of featurizations, a forecast configuration, a forecast type, a forecast horizon, an evaluation parameter, a number of testing windows, a window offset, a context length, an epoch, a learning rate, a learning rate decay, a likelihood, a maximum learning rate decays, a number of averaged models, a number of cells, a number of layers, a use of related data, or a use of item metadata.

12. The computer-implemented method of claim 6, wherein the current task involves time-series forecasting based, at least in part, upon time-series data contained in the dataset.

13. The computer-implemented method of claim 6, wherein the resource instances are physical instances or virtual instances.

14. The computer-implemented method of claim 6, wherein identifying a resource instance includes identifying a smallest resource instance that is available at a current time to perform the current task.

15. A system, comprising:

at least one processor; and memory including instructions that, when executed by the at least one processor, cause the system to:

receive a request to perform a current task with respect to a dataset;

compare current values for a set of parameters for the current task against prior values for a set of previously-performed tasks performed using resource instances of different sizes;

identify a resource instance, of the resource instances of different sizes, for which the prior values for at least one of the previously-performed tasks are at least as large as corresponding values for the current task; and allocate the identified resource instance to perform the current task.

16. The system of claim 15, wherein the instructions when executed further cause the system to:

select the previously-performed tasks as a set of testing tasks having different testing values for the set of parameters; and perform the previously-performed tasks using the resource instances to determine one or more of the resource instances having individual sizes and that successfully perform the testing task.

17. The system of claim 15, wherein individual tasks are performed in multiple rounds with the resource instances of the different sizes, wherein the different sizes are selected from size ranges determined based, at least in part, the individual sizes of the resource instances that were able to successfully, or unsuccessfully, perform the individual tasks.

18. The system of claim 17, wherein at least one of the resource instances to perform at least one of the individual tasks for each of the multiple rounds is selected near a midpoint of a size range determined for at least one of the multiple rounds.

19. The system of claim 15, wherein the set of parameters include parameters relating at least the dataset, an algorithm to perform the current task, or one or more hyperparameters relating to the algorithm.

20. The system of claim 15, wherein the current task is different from any of the previously-performed tasks.

* * * * *